US010270511B2

(12) United States Patent
Ouyang

(10) Patent No.: US 10,270,511 B2
(45) Date of Patent: Apr. 23, 2019

(54) ROBUST WIRELESS MULTIMEDIA TRANSMISSION IN MULTIPLE IN MULTIPLE-OUT (MIMO) SYSTEM ASSISTED BY CHANNEL STATE INFORMATION

(75) Inventor: Xuemei Ouyang, San Jose, CA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1374 days.

(21) Appl. No.: 11/719,490

(22) PCT Filed: Nov. 16, 2005

(86) PCT No.: PCT/IB2005/053784
§ 371 (c)(1),
(2), (4) Date: May 16, 2007

(87) PCT Pub. No.: WO2006/054249
PCT Pub. Date: May 26, 2006

(65) Prior Publication Data
US 2009/0147876 A1 Jun. 11, 2009

Related U.S. Application Data

(60) Provisional application No. 60/628,682, filed on Nov. 17, 2004.

(51) Int. Cl.
*H04B 7/06* (2006.01)
*H04B 7/0417* (2017.01)
(Continued)

(52) U.S. Cl.
CPC ......... *H04B 7/0634* (2013.01); *H04B 7/0417* (2013.01); *H04N 19/102* (2014.11);
(Continued)

(58) Field of Classification Search
CPC .. H04B 7/0634; H04B 7/0417; H04N 19/102; H04N 19/164; H04N 19/187; H04N 19/34; H04N 19/37; H04N 19/39
(Continued)

(56) References Cited

U.S. PATENT DOCUMENTS 7,167,690 B2 1/2007 Baker
2003/0003863 A1* 1/2003 Thielecke et al. ............... 455/39
(Continued)

FOREIGN PATENT DOCUMENTS

EP 1445886 A 8/2004
WO WO03073646 A1 9/2003
(Continued)

OTHER PUBLICATIONS

Miyashita et al., "Eigenbeam-Space Division Multiplexing (E-SDM) in a MIMO Channel", The Institute of Electronics, Information and Communication Engineers, Technical Report of IEICE, May 17, 2002, pp. 13-18.
(Continued)

*Primary Examiner* — Kabir A Timory
(74) *Attorney, Agent, or Firm* — Larry Liberchuk

(57) ABSTRACT

A system and method is provided wherein channel state information assisted MIMO transmission based on singular value decomposition (SVD) (204) (304) simplifies the decoding process. The present invention is a joint source and channel coding system and method for robust wireless multimedia communication. Using the fact that SVD redistributes the channel energy in a descending way, the base layer of the Fine-Grained-Scalability (FGS) (208) is mapped to the highest signal-to-noise (SNR) path to obtain better protection, while other enhancement layers are mapped to other paths such that less important layers are mapped to lower SNR paths in the SVD-decomposed channel. A mul-
(Continued)

tiple description code (MDC) (207) is also used in this manner such that at least one coded stream is provided more protection because of the high SNR. This invention pertains to any MIMO based wireless multimedia communication system.

9 Claims, 3 Drawing Sheets

(51) Int. Cl.
 *H04N 19/102* (2014.01)
 *H04N 19/37* (2014.01)
 *H04N 19/164* (2014.01)
 *H04N 19/187* (2014.01)
 *H04N 19/39* (2014.01)
 *H04N 19/34* (2014.01)

(52) U.S. Cl.
 CPC ......... *H04N 19/164* (2014.11); *H04N 19/187* (2014.11); *H04N 19/34* (2014.11); *H04N 19/37* (2014.11); *H04N 19/39* (2014.11)

(58) Field of Classification Search
 USPC .................. 375/267, 260, 299, 347, 349
 See application file for complete search history.

(56) References Cited

U.S. PATENT DOCUMENTS

| | | |
|---|---|---|
| 2003/0185309 A1 | 10/2003 | Pautler |
| 2003/0185310 A1 | 10/2003 | Ketchum |
| 2003/0218973 A1* | 11/2003 | Oprea et al. .................. 370/210 |
| 2004/0042556 A1* | 3/2004 | Medvedev et al. ........... 375/260 |
| 2004/0253980 A1* | 12/2004 | Lane ..................... H04L 1/0009 455/552.1 |
| 2005/0201307 A1* | 9/2005 | Chae et al. ................... 370/310 |

FOREIGN PATENT DOCUMENTS

| | | |
|---|---|---|
| WO | 2004014083 A | 2/2004 |
| WO | WO2004077832 A1 | 9/2004 |

OTHER PUBLICATIONS

Zhu Ji et al., "Video Broadcasting Over MIMO-OFDM Systems", Proceedings of the 2003 International Symposium on Circuits and Systems, ISCAS '03. May 25-28, 2003, vol. 2., pp. II-844-II-847.
Xiaofeng Xu et al., "Adaptive Error Control for Fine-Granular-Scalability Video Coding over IEEE 802.11 Wireless LANs", Proceedings of the 2003 International Conference on Multimedia and Expo, Jul. 6-9, 2003. ICME '03., vol. 1 , pp. I-669-I-672.
Van Der Schaar M. et al., "Adaptive Cross-Layer Protection Strategies for Robust Scalable Video Transmission over 802.11 WLANs", IEEE Journal on Selected Areas in Communications, Dec. 2003, pp. 1752-1763, vol. 21 , Issue: 10.
Van Der Schaar M. et al., "Robust Transmission of MPEG-4 Scalable Video over 4G Wireless Networks", International Conference on Image Processing. 2002, Jun. 24-28, 2002, pp. 757-760, vol. 3.
Leyonhjelm et al., "PHY Technologies for Next Generation WLAN", Australian Telecommunications Cooperative Research Centre, Acreo Optics and Electronics Conference, Oct. 22, 2003.
Runhua, Chen et al., "High Speed Wireless Data Transmission in Layered Space-Time Trellis Coded MIMO Systems", The 57th IEEE Semiannual Vehicular Technology Conference, 2003. VTC 2003—Spring, Apr. 22, 2003, pp. 52-56, vol. 1.
Kimura H. et al., "A Study on SDM Turbo Codes in a MIMO Channel", The Institute of Electronics, Information and Communication Engineers, Technical Report of IEICE. RCS 2002-93, vol. 102, No. 204, Jul. 17, 2002, pp. 19-24.
Muramatsu H. et al., "Multi-stream Video Transmission System Using Subsampling for Error Resilience", The Institute of Electronics, Information and Communication Engineers, Technical report of IEICE, CS2002-120, vol. 102, No. 516, Dec. 16, 2002, pp. 29-34.

* cited by examiner

ROBUST WIRELESS MULTIMEDIA TRANSMISSION IN MULTIPLE IN MULTIPLE-OUT (MIMO) SYSTEM ASSISTED BY CHANNEL STATE INFORMATION

The present invention relates to a MIMO based wireless multimedia communication system.

Multimedia transmission over wireless networks is becoming more prevalent because of an increasing market demand. The constituent parts of current wireless communication protocols have been developed in an independent fashion, without paying any particular attention to specific transmission type needs. The physical layer, the MAC layer and the source coding all have been developed independently. Each layer has been optimized to the greatest extent possible. The possibility to optimize the system with joint source and channel coding has been identified which has the potential to increase the efficiency of a system without adding too much complexity in the system design. Much research has been directed to finding better ways for the joint channel and source coding. J. P. Meehan and M. van der Schaar in "*A Concept for Combined MPEG-4 FGS and Hierarchical Modulation for Wireless Video Transmission,*" Philips Research USA-TN-2001-044, 2001, the contents of which are hereby included by reference in their entirety, describe one such approach for a single antenna system by combining fine grained scalability (FGS) video coding with adaptive modulation.

Currently, available solutions for multimedia over a MIMO system are implemented as follows. When an FGS or a multiple description code (MDC) coded system is transmitted over a MIMO system, all the streams receive the same transmission power. Thus for FGS, the essential base layer needs to be transmitted with a lower constellation while other enhancement layers can be transmitted with a higher constellation modulation. They are then transmitted using a different antenna. An MDC does not require different modulation for different source coded streams. When using a MIMO for transmission, different streams can be transmitted on a different antenna. However, at least one stream must be received correctly so that the contents can be decoded. This approach only takes advantage of spatial diversity over the MIMO system. It may happen that the channel condition is so bad that SNR on any of the Transmitter and Receiver antenna pairs is too low to deliver a reliable transmission. For FGS, if the base layer is not correctly received, the multimedia contents cannot be recovered. For an MDC, if none of the streams is received without error, the decoding cannot be accomplished.

The system and method of the present invention provides a joint channel and source coding scheme using Channel State Information (CSI) over a Multiple In and Multiple Out (MIMO) wireless communication system. The source coding can be FGS or multiple description code (MDC).

In a preferred embodiment, based on the CSI, the distribution of the transmission energy in the channel is different for different streams. Consider a MIMO system. By some manipulation means, the signal transmitted on an antenna pair 1 is allocated 80% of the entire energy, while signals on other antenna pairs are allocated the rest or 20% of the entire energy. This approach discriminates among antenna pairs and is accomplished in accordance with existing channel conditions at the time of transmission. This means that antenna pair 1 is allocated the highest SNR in the system. The higher SNR assigned to a pair makes its transmissions more reliable than in a system in which energy is equally distributed among antenna pairs. In this way, for FGS source coding the base layer can be transmitted over the antenna pair that has the largest energy assigned according to existing channel conditions. The result is that the base layer enjoys the highest possible SNR over the MIMO channel, while other enhancement layers can be transmitted with lower SNR because they are not as important as the base layer.

For MDC source coding, one stream is transmitted over a high SNR channel while others are transmitted in some lower SNR channel. As long as one stream is reliably received, the multimedia stream can be decoded. The addition of an enhancement layer for FGS or more streams for MDC only increases the quality of the video.

Figure 1:
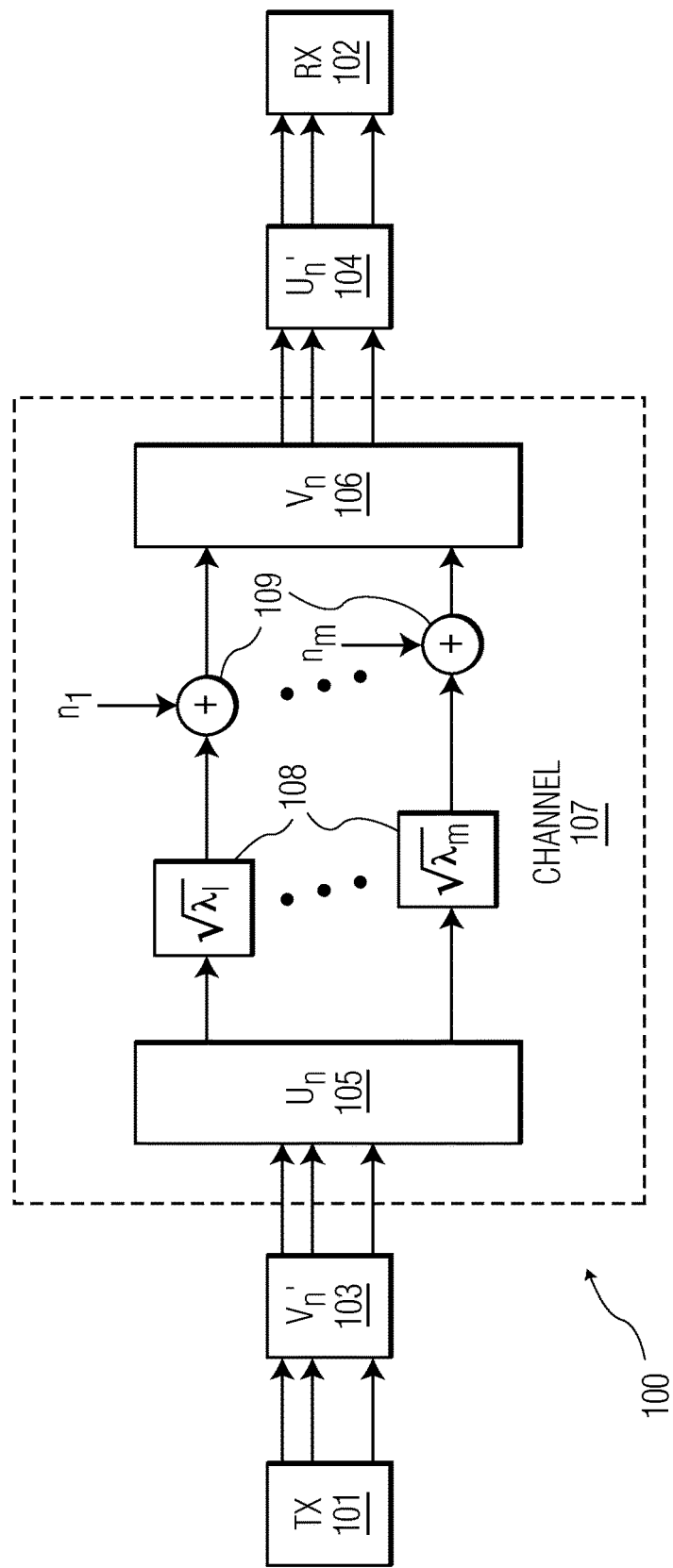
FIG. 1 illustrates CSI-assisted MIMO transmission by a wireless device according to the present invention.

In the following description, by way of explanation and not limitation, specific details are set forth such as the particular architecture, interfaces, techniques, etc., in order to provide a thorough understanding of the present invention. However, it will be apparent to those skilled in the art that the present invention may be practiced in other embodiments that depart from these specific details.

The system and method of the present invention provides a more robust multimedia transmission within wireless networks by taking advantage of the channel state information (CSI). The CSI-assisted transmission of the present invention is combined with a source coding scheme that optimizes the wireless multimedia transmission system. Thus, the system and method of the present invention is well suited to scalable video/audio transmission because it affords different protection priority to different video streams.

In the following sections, the first CSI-aided transmission in a MIMO system is described. Then, how the system and method of the present invention maps different multimedia streams onto different antennae of the system is disclosed.

In a preferred embodiment, a CSI-aided transmission in a MIMO system can be achieved as follows. Using some measurements and feedback from the receiver 102, a MIMO channel H can be made available at transmitter side 101. Many feedback methods are possible. The preferred feedback method is the simplest. The channel is estimated at the receiver side and the channel coefficient is transmitted back to the transmitter as a normal digital signal. While there are some issues with the feedback scheme, such as RF calibration to make the channel match, these issues can be handled in well-known ways to one ordinarily skilled in the art. The only assumption made herein is that the channel is quasi-static and reciprocal.

In this preferred embodiment, it is convenient to decompose the estimated channel matrix $H_n$ by means of the Singular Value Decomposition (SVD) so that $$H_n = U_n D_n V_n' \tag{1}$$

where (a) $U_n$ and $V_n$ are unitary complex matrices (i.e. $U_n U_n' = I$, etc.) of dimensions R×M and M×L respectively, (b) $D_n$ is a real diagonal matrix of dimension M×M containing, in descending order, the non-negative singular values of $H_n$ (which are in fact the square roots of the eigen-values of $H_n H_n'$ or $H_n' H_n$), and (c) the subscripts n are again a reminder of the noisy nature of the channel estimate $H_n$.

The received signal can then be expressed as $$Y = HX + N = U_n D_n V_n' X + N \quad (2)$$

where N is the white Gaussian noise with zero mean and variance $\sigma^2$.

The channel is SVD decomposed, while the signal is only multiplied by the decomposed matrix from channel. The mapping is actually on a "logical" channel instead of the physical channel because after pre/post equalization (matrix from SVD), the signal is mapped to a logical channel with different Dn value.

In this preferred embodiment, the receiver estimates the channel and the receiver performs the SVD decomposition. Then the receiver stores the $U_n$ and $D_n$ matrices and feeds back the $V_n$ matrix to the transmitter to multiply with data in the next packet, assuming the channel will not change during this period. In an alternative embodiment, the transmitter performs the SVD and feeds back the $U_n$ matrix to the receiver after the SVD.

Since $U_n$ 105 and $V_n$ 106 are known at the transmitter side, prior to transmission the signal can be multiplied (pre-equalization) with $V_n$ 106, and at the receiver side 102 the received signal can be multiplied with $U_n'$ 104. Then equation (2) becomes $$U_n'Y = U_n'H V_n X + N = U_n' U_n D_n V_n' V_n X + U_n' V_n N = D_n X + N \quad (3)$$

in which different streams can be easily separated because $D_n$ is a diagonal matrix. Since in $D_n$ all the singular values are arranged in descending order, the first stream (signal) in X is allocated the largest gain in the channel. Thus, this steam has the highest SNR for the channel given.

Then, in all embodiments, different source coding streams are mapped onto the antennae. From the above description, it can be seen that the path with the largest singular $\sqrt{\lambda_1}$ 108 holds the largest SNR in the channel and, therefore, the base layer of FGS code can be mapped onto it. The enhancement layers can be mapped to other paths with more important layers mapped onto the larger singular value paths. In this way, the more important layers are protected better with higher SNR in the channel. For MDC streams, it really does not matter which stream maps to which singular value path because MDCs are equally important and receiving any one of the MDC streams can result in correct decoding of the multimedia source. However, at least one MDC stream must be correctly received. Given the uneven SNR distribution in the system and method of the present invention, one MDC stream can always be sent in better channel condition, which increases its chances of being sent correctly.

Figure 2:
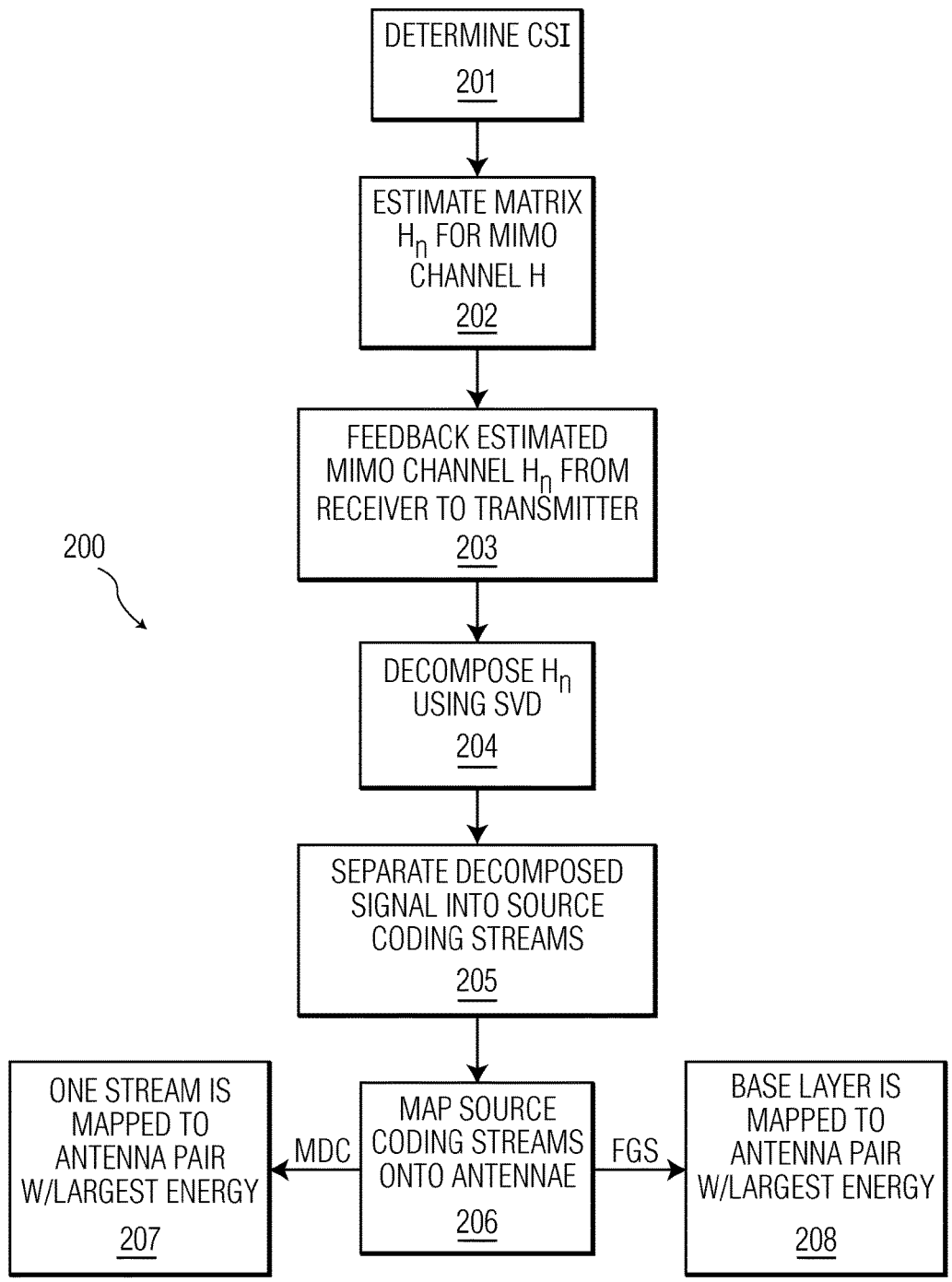
FIG. 2 illustrates a flow diagram of the present invention.

Referring now to FIG. 2, a flow 200 of the procedure of the present invention is illustrated. At step 201 the Channel State Information (CSI) is determined. At the receiver, matrix $H_n$ is estimated at step 202 for MIMO channel H. At step 203 the estimated MIMO channel $H_n$ is fed back to the transmitter from the receiver and then decomposed at step 204 using Singular Value Decomposition (SVD). The decomposed signal is separated into source coding streams at step 205 and then mapped onto the antennae at steps 206-208.

Figure 3:
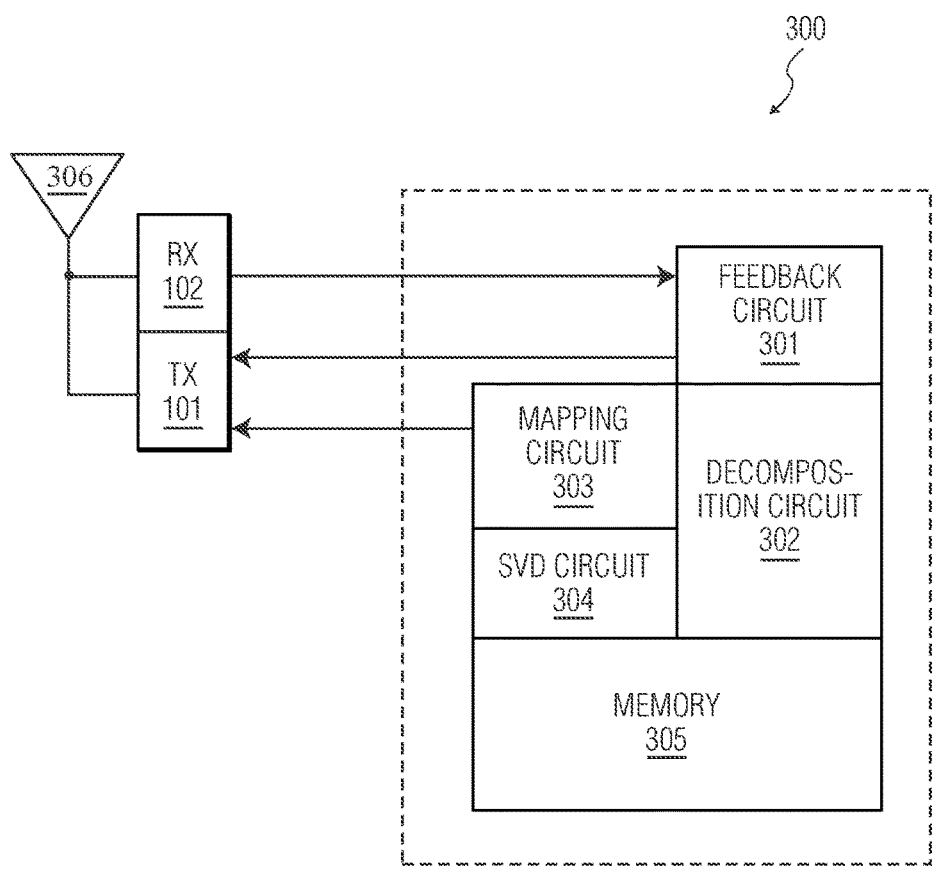
FIG. 3 illustrates a simplified block diagram of a wireless device in an ad hoc wireless network according to an embodiment of the present invention.

Referring now to FIG. 3, a typical wireless device 300 modified according to the present invention is illustrated. The device comprises a transmitter 101 and a receiver 102, both of which are operatively coupled to a plurality of antennae 306 (only one is shown). The device incorporates a feedback circuit 301 that is operatively coupled between the receiver 102 and the transmitter 101 to feedback a received MIMO channel H using some measurements and feedback from the receiver 102 to the transmitter 101. A decomposition circuit 302 decomposes an estimated matrix $H_n$ for the MIMO channel H, and a mapping circuit 303, comprising an SVD circuit 304, that pre-equalizes and separates the decomposed signal into a plurality of different source coding streams and then maps the streams onto the plurality of antennae 306 for transmission by the transmitter 101. The device further comprises a memory 305 for storing matrices pertinent to the decomposition and mapping, e.g., $U_n$, $V_n$ and $D_n$ matrices.

The system and method of the present invention can be used in any wireless multimedia transmission with a MIMO system, such as a wireless home network, multimedia streams transmitted over a wireless LAN, and in MIMO systems for wireless multimedia transmission using IEEE 802.11n. Also, in only the CSI-assisted MIMO system, because of the pre-equalization, the decoder needed at the receiver side is much simpler than a traditional zero-forced (ZF) or MMSE MIMO decoder. The only overhead in the system and method of the present invention is the feedback of the channel state information from receiver to transmitter.

While the preferred embodiments of the present invention have been illustrated and described, it will be understood by those skilled in the art that various changes and modifications may be made, and equivalents may be substituted for elements thereof without departing from the true scope of the present invention. For example, an absolute time reference is supplied in an outer layer of a Measurement Request Frame or in an inner layer of an individual basic request of a Measurement Request Element in any combination with a Measurement Mode. In addition, many modifications may be made to adapt to a particular situation, such as format changes of the frames and elements, and the teaching of the present invention can be adapted in ways that are equivalent without departing from its central scope. Therefore it is intended that the present invention not be limited to the particular embodiment disclosed as the best mode contemplated for carrying out the present invention, but that the present invention include all embodiments falling within the scope of the appended claims.

What is claimed is:

1. A method for multimedia transmission in a multiple in multiple out MIMO system over a wireless MIMO channel H, the method comprising:

decomposing an estimated channel matrix $H_n$ for the MIMO channel H by a singular value decomposition (SVD) in such a way that:

$$H_n = U_n D_n V_n',$$

where $U_n$ and $V_n$ are unitary matrices of dimensions R×M and M×L respectively, and $D_n$ is a diagonal matrix of dimension M×M containing, in descending order, non-negative singular values of $H_n$, which are square roots of eigenvalues of $H_n H_n'$ or $H_n' H_n$;

pre-equalizing a signal with a unitary matrix $V_n$ received from a receiver;

using the diagonal matrix obtained from said SVD to separate the pre-equalized signal into a plurality of different source coding streams, the plurality of different source coding streams comprising a base layer and at least one enhancement layer, wherein the base layer enables decoding of at least one multimedia content that is carried in the plurality of source coding streams and the enhancement layer is usable to improve a quality of the at least one multimedia content of the base layer when the base layer is decoded;

mapping said base layer onto a stream of said plurality of different source coding streams having a largest signal-to-noise ratio (SNR);

mapping said at least one enhancement layer to others of said plurality of different source coding streams than the stream having the largest SNR; and mapping each of the plurality of different source coding streams onto an antenna for transmission.

2. The method of claim 1, further comprising using feedback from the receiver to determine information about the MIMO channel H at the transmitter.

3. The method of claim 1, wherein in a real diagonal matrix all the singular values are arranged in descending order and a first stream thereof in the signal is allocated a largest gain in the MIMO channel H, such that the first stream has a highest signal-to-noise ratio (SNR).

4. The method of claim 1, wherein said different source coding comprises at least one source coding selected from a group consisting of fine grained scalability (FGS) and multiple description code (MDC).

5. A multiple-in-multiple-out (MIMO) system for transmission in a wireless network, comprising:

a plurality of antennae;

a transmitter operatively coupled to said plurality of antennae for transmitting a wireless MIMO signal over a MIMO channel H;

a decomposition circuit that decomposes an estimated matrix $H_n$ of the MIMO channel H by a singular value decomposition (SVD) in such a way that:

$H_n = U_n D_n V_n'$, where $U_n$ and $V_n$ are unitary matrices of dimensions R×M and M×L respectively, and $D_n$ is a diagonal matrix of dimension M×M containing, in descending order, non-negative singular values of $H_n$, which are square roots of eigenvalues of $H_n H_n'$ or $H_n' H_n$;

a mapping circuit configured to:

pre-equalize a signal with a unitary matrix $V_n$ received from a receiver; the mapping circuit using the diagonal matrix obtained from the SVD to separate the pre-equalized signal into a plurality of different source coding streams using a diagonal matrix obtained from the SVD, the plurality of different source coding streams comprising a base layer and at least one enhancement layer, wherein the base layer enables decoding of at least one multimedia content in the plurality of different source coding streams and the enhancement layer is usable to improve a quality of the at least one multimedia content of the base layer when the base layer is decoded;

map the base layer onto a stream of said plurality of different source coding streams having a largest signal-to-noise ratio (SNR);

map the at least one enhancement layer to others of said plurality of different source coding streams than the stream having the largest SNR; and map the plurality of different source coding streams onto the plurality of antennae for transmission by the transmitter.

6. The MIMO system of claim 5, further comprising a feedback circuit configured to use at least one pre-determined measurement and the MIMO channel to make information about the MIMO channel H available at the transmitter.

7. The MIMO system of claim 5, wherein in a real diagonal matrix all the singular values are arranged in descending order and a first stream thereof in the signal is allocated a largest gain in the MIMO channel such that the first stream has a highest SNR for the channel given.

8. The MIMO system of claim 5, wherein said different source coding comprises at least one source coding selected from a group consisting of fine grained scalability (FGS) and multiple description code (MDC).

9. A device for transmission in a wireless network, comprising:

a decomposition circuit to estimate a channel matrix $H_n$ of a MIMO channel H and provide a decomposed channel estimate therefrom by a singular value decomposition (SVD) in such a way that:

$H_n = U_n D_n V_n'$, where $U_n$ and $V_n$ are unitary matrices of dimensions R×M and M×L respectively, and $D_n$ is a diagonal matrix of dimension M×M containing, in descending order, non-negative singular values of $H_n$, which are square roots of eigenvalues of $H_n H_n'$ or $H_n' H_n$;

a mapping circuit configured to:

pre-equalize a signal with a unitary matrix $V_n$ received from a receiver;

separate the pre-equalized signal into a plurality of different source coding streams using the diagonal matrix obtained from the SVD, the plurality of different source coding streams comprising a base layer and at least one enhancement layer, wherein the base layer enables decoding of at least one multimedia content encoded in the plurality of different source coding streams and the enhancement layer is usable to improve a quality of the at least one multimedia content of the base layer when the base layer is decoded;

map the base layer onto a stream of said plurality of different source coding streams having a largest signal-to-noise ratio (SNR);

map the at least one enhancement layer to others of said plurality of different source coding streams than the stream having the largest SNR; and map streams onto a plurality of antennae for transmission by a transmitter.

* * * * *